(12) United States Patent
Herbert et al.

(10) Patent No.: US 7,770,003 B2
(45) Date of Patent: Aug. 3, 2010

(54) UPDATING FIRMWARE SECURELY OVER A NETWORK

(75) Inventors: Howard C. Herbert, Phoenix, AZ (US); Moshe Maor, Kiryat Mozkin (IL)

(73) Assignee: Intel Corporation, Santa Clara, CA (US)

( * ) Notice: Subject to any disclaimer, the term of this patent is extended or adjusted under 35 U.S.C. 154(b) by 1584 days.

(21) Appl. No.: 11/024,583

(22) Filed: Dec. 29, 2004

(65) Prior Publication Data

US 2006/0143475 A1     Jun. 29, 2006

(51) Int. Cl.
  *G06F 9/00*     (2006.01)
(52) U.S. Cl. .......................... 713/160; 713/193; 380/28
(58) Field of Classification Search ................ 713/160, 713/193; 380/28
  See application file for complete search history.

(56) References Cited

OTHER PUBLICATIONS

PCI Express Base Specification Revision 1.0, Jul. 22, 2002, 15 pgs.
PCI-X Addendum to the PCI Local Bus Specification Revision 1.0a, Jul. 24, 2000 PCI Special Interest Group, 9 pgs.
IEEE Std 802.3, Mar. 8, 2002, Revision of IEEE, STD 802.3, 2000 Edition, 802.3: IEEE Standard for Information Technology—Telecommunications and information exchange between systems—Local and metropolitan area networks—Specific requirements, Part 3: Carrier Sense Multiple Access with Collision Detection (CSMA/DC) Access Method and Physical Layer Specifications, 11 pgs.
Transmission Control Protocol, DARPA Internet Program, Protocol Specification, 73 pgs., Sep. 1981.
Internet Protocol, DARPA Internet Program, Protocol Specification, 41 pgs., Sep. 1981.
Digital Signature Standard (DSS), Federal Information Processing Standards Publication 186-2, 76 pgs., Jan. 27, 2000.

*Primary Examiner*—Thomas Peeso
(74) *Attorney, Agent, or Firm*—Grossman, Tucker, Perreault & Pfleger, PLLC (57) ABSTRACT

A method according to one embodiment may include: receiving a first encrypted signal at a server of a computing network, the first encrypted signal comprising firmware encrypted by a first encryption algorithm having a first complexity level; sending a second encrypted signal over the computing network to at least one managed client in response to the first encrypted signal, the second encrypted signal comprising the firmware encrypted by a second encryption algorithm having a second complexity level, wherein said first complexity level is greater than said second complexity level; and updating existing firmware of the at least one managed client in response to receipt of the second signal at the at least one managed client. Of course, many alternatives, variations, and modifications are possible without departing from this embodiment.

12 Claims, 6 Drawing Sheets

UPDATING FIRMWARE SECURELY OVER A NETWORK

FIELD

This disclosure relates to updating firmware securely over a network.

BACKGROUND

A computing environment may include a managed network with a plurality of managed clients and one or more management servers. Each managed client may include a variety of devices such as a personal computers (PCs), servers, printers, modems, and other devices. An information technology (IT) administrator for the managed network may coordinate a variety of management and monitoring functions for the managed devices using a variety of hardware, firmware, and/or software products. One such function may include updating firmware on each managed client provided by a remote supplier.

To perform remote firmware updates, one conventional method may require the IT administrator to manually upload software to each managed client to permit receipt of the firmware update. For example, this may include uploading Alert Standard Format (ASF) instructions into flash memory on each managed client. This requires manual intervention by the IT administrator and results in an increase in overhead IT costs. Another conventional remote firmware update method may be to distribute the firmware update from the management server to each managed client without any cryptographic integrity protection. This makes such firmware updates vulnerable to attack from any variety of malicious software (malware) such as viruses, worms, replay attacks, etc.

Another conventional remote firmware update method may be to include digital signatures and strong encryption methods in an end-to-end process from the remote supplier to each managed client. Although providing for secure firmware updates, this method requires complex decryption at each managed client. This method may also require significant additional memory resources at each managed client which adds to the cost and power consumption of each managed client.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
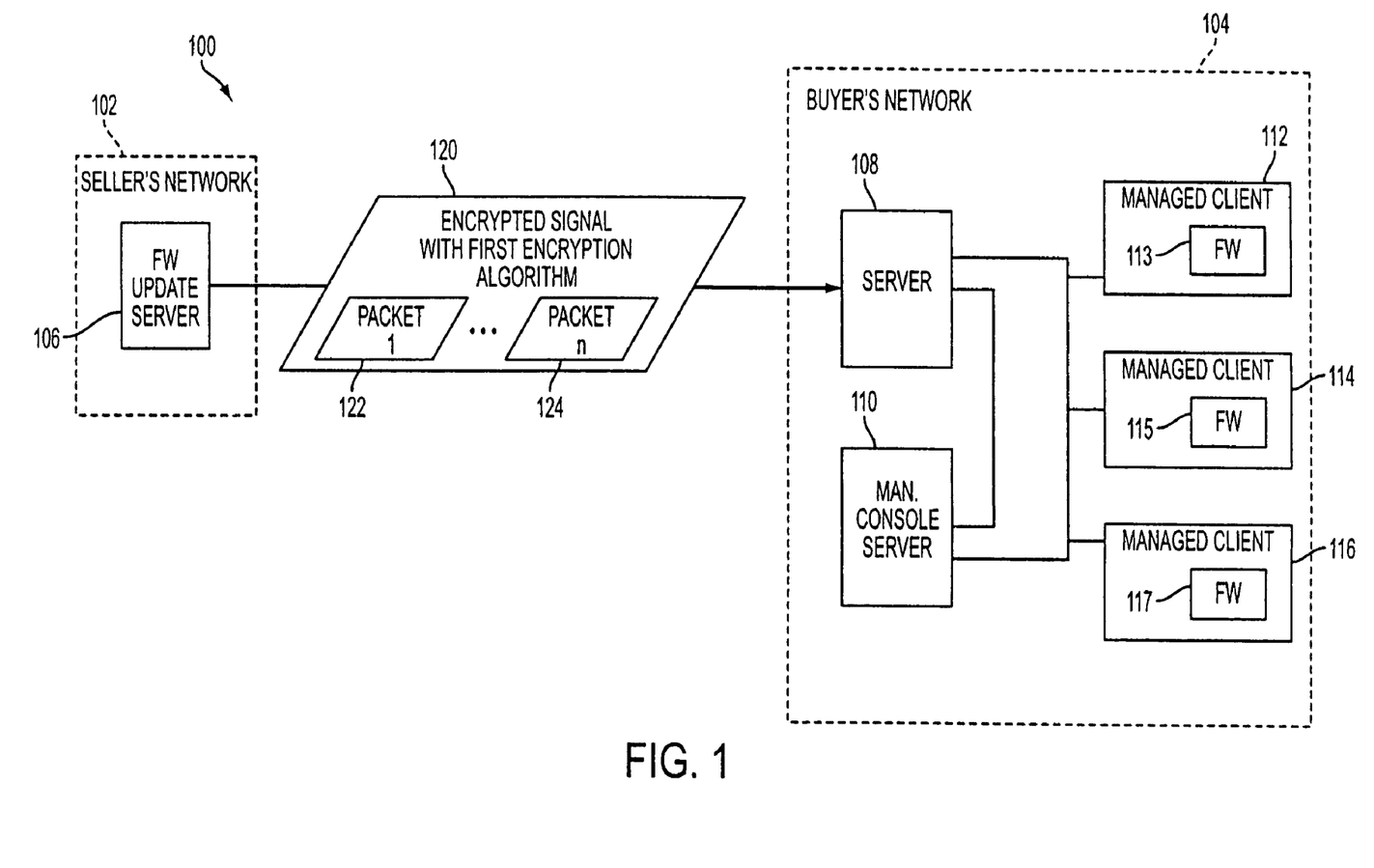
FIG. 1 is a diagram illustrating a system embodiment.

FIG. 1 illustrates a system 100 consistent with an embodiment. The system 100 may include a remote seller's network 102 and a buyer's network 104 capable of bidirectional communication with each other. The seller's network 102 may include a server 106 that provides firmware to the buyer's network 104. The buyer's network 104 may include one or more servers such as server 108 and management console server 110. The buyer's network 104 may further contain one or more managed clients 112, 114, 116 that may exchange data with each other, with servers 108, 110, and with other devices that may communicate with the servers 108, 110. Each managed client 112, 114, 116 may include a variety of devices such as a PC, printer, modem, and other networked devices.

One or more of the managed clients 112, 114, 116 may have existing firmware that provides any variety of functions. For instance, managed clients 112, 114, 116 may have existing firmware 113, 115, 117. Updates for the firmware 113, 115, 117 may become available from time to time as developed by a seller. When a firmware update becomes available, the server 106 of the seller's network 102 may provide a signal 120 to the server 108 of the buyer's network 104. The signal 120 may comply or be compatible with a variety of communication protocols. One such communication protocol may be an Ethernet protocol. The Ethernet protocol may comply or be compatible with the Ethernet standard published by the Institute of Electrical and Electronics Engineers (IEEE) titled the IEEE 802.3 Standard, published in March, 2002 and/or later versions of this standard. Another communication protocol may be Transmission Control Protocol/Internet Protocol (TCP/IP) that may comply or be compatible with the Transmission Control Protocol Specification published by the Information Sciences Institute, dated 1981, and the Internet Protocol Specification also published by the Information Sciences Institute, dated 1981 and/or later versions of these Specifications.

Depending at least in part on the communication protocol utilized, the signal 120 may be parsed into a plurality of packets 122 . . . 124 for efficient routing. As used herein, a "packet" may be a unit of data that may comprise one or more symbols and/or values. The size, type, and attributes of such packets may be defined, at least partially, by the particular communication protocol being utilized.

The signal 120 may include firmware encrypted by a first encryption algorithm and it may also include digital signatures. The first encryption algorithm may be a relatively strong encryption algorithm such as the Advanced Encryption Standard (AES) method of encryption. The AES encryption may be utilized as part of a Transport Layer Security (TLS) protocol to ensure private communication between the seller's network and the buyer's network. This first encryption algorithm may require the server 108 to have significant extra memory resources such as read only memory (ROM), random access memory (RAM), and flash memory in order to assist with decryption of the first encryption algorithm. The server 108 may also include a proper decryption key to "undo" the work of the first encryption algorithm. The signal 120 may also include one or more digital signatures used by the server 108 to authenticate the identity of the sender of the signal 120. The digital signature may comply or be compatible with the Digital Signature Standard (DSS) developed by the United States National Security Agency as specified in the Federal Information Processing Standard (FIPS) 186, published January 2000 and/or later versions of this Standard. The server 108 may decrypt the encrypted firmware encrypted by the first encryption algorithm and store the decrypted firmware in a storage location. In one embodiment, the storage location may be in memory of the server 108.

Figure 2A:
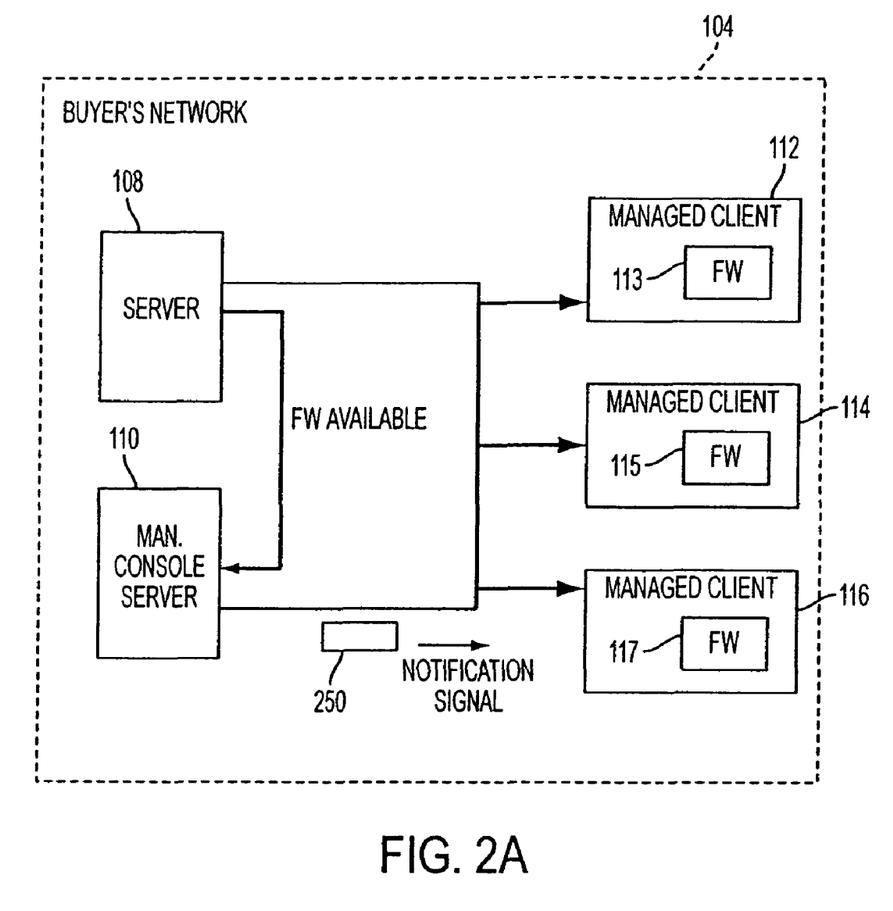
FIG. 2A is a diagram illustrating the buyer's network of FIG. 1.

FIG. 2A illustrates the buyer's network 104 of FIG. 1 notifying each managed client that updated firmware is available. Once the decrypted firmware is successfully stored in a storage location, e.g., in the server 108, the server 108 may notify the management console server 110 that a new firmware update is available. The management console server 110 may then provide a notification signal 250 to applicable managed clients 112, 114, 116 having existing firmware 113, 115, 117 that may be updated. Although two servers 108, 110 are utilized in the illustrated embodiment, one server may alternatively be utilized to provide the functionality provided by both servers 108 and 110.

Figure 2B:
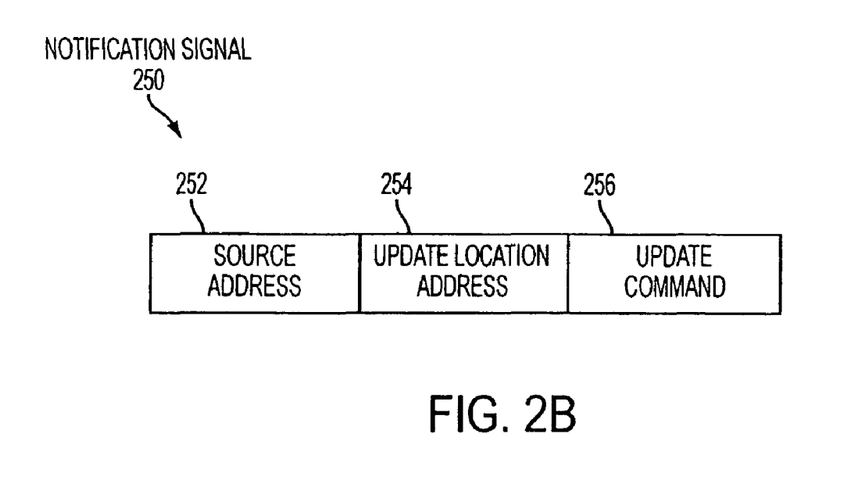
FIG. 2B is a diagram of the notification signal of FIG. 2A.

The notification signal 250, as illustrated in FIG. 2B, may include a portion 252 representative of the source address of the server sending the notification signal. In the embodiment of FIG. 2A, this may be the source address of the management console server 110. The notification signal 250 may also include a portion 254 representative of an address of the storage location where the new firmware is located. This may be the address of the server 108 in one embodiment. Other embodiments may utilize other storage locations. The notification signal 250 may also include a portion 256 representative of a firmware update command instructing the managed client to download the available firmware update.

Each managed client 112, 114, 116 that receives the notification signal 250 may then perform an authentication process on the notification signal. This authentication process may include checking the origin of the notification signal 250 to verify it is from an authentic and competent source for firmware updates. This authentication process may also include checking the authenticity of the update command 256 of the notification signal 250. Each managed client 112, 114, 116 may have management firmware to perform the authentication process which may check the origin and authenticity of the update command. If any of these checks fail, the update command 256 of the notification signal 250 may be ignored by the managed client. If the checks are successful, each managed client 112, 114, 116 may enter a firmware update mode.

Figure 3:
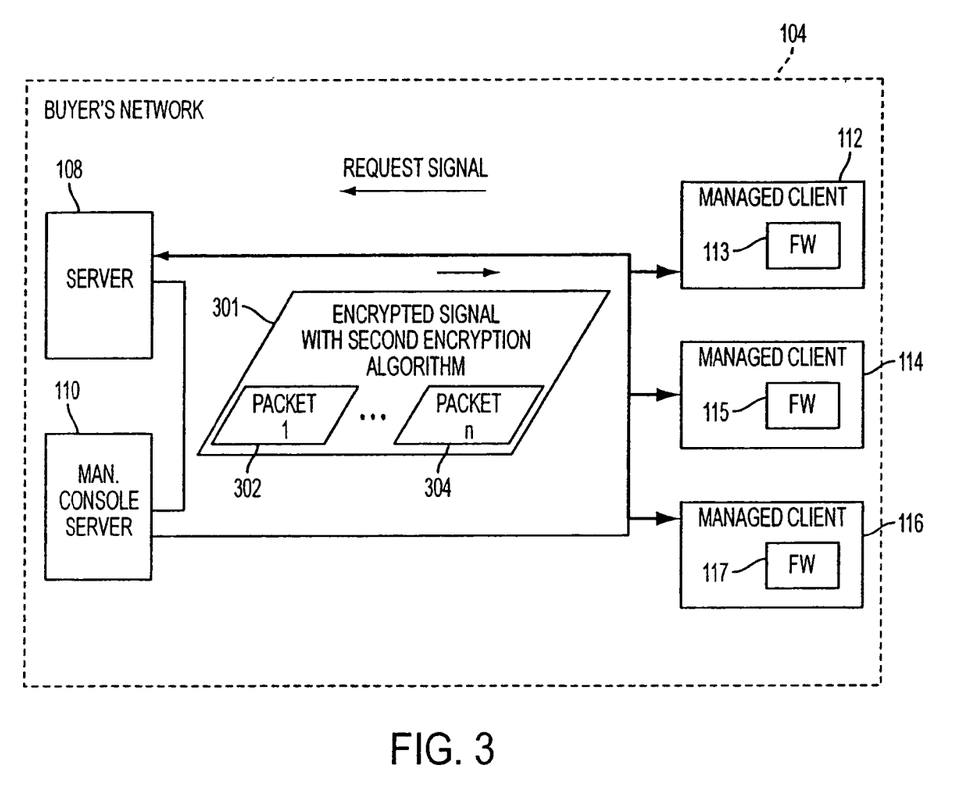
FIG. 3 is another diagram illustrating the buyer's network of FIG. 1.

FIG. 3 illustrates the buyer's network 104 of FIG. 1 in the firmware update mode. In the firmware update mode, each managed client 112, 114, 116 may send a request signal to the storage location, e.g., the server 108 in one instance, requesting the new firmware. Each managed client 112, 114, 116 may know the proper address for this request signal from that portion 254 of the notification signal 250 indicating the address of the storage location of the decrypted firmware.

In response to receipt of the request signal, the server 108 may send, and the requesting managed client may download, an encrypted signal 301 having the new firmware encrypted with a second encryption algorithm. The second encryption algorithm may be less complex than the first encryption algorithm utilized by the sellers' server 106. "Complex", as used herein, may be used in reference to the amount of processing and/or memory a particular encryption algorithm may require. Thus, for example, the second encryption algorithm may have a first complexity level and the second encryption algorithm may have a second complexity level, and in this embodiment, the first complexity level may be greater than the second complexity level The second encryption algorithm may include computing an integrity check value (ICV) by using a hashed message authentication code (HMAC) and provisioned shared secret key.

The encrypted signal 301 may include a plurality of packets 302 . . . 304. The encrypted signal 301 may comply with a non-authenticating type of communication protocol since the notification signal 250 was already authenticated. One example of a non-authenticating communication protocol may be the Trivial File Transfer Protocol (TFTP). Each packet 302 . . . 304 may be encrypted by the second encryption algorithm for security and each packet 302 . . . 304 may include an ICV. Each packet 302 . . . 304 of the signal 301 may also have sequential numbers. The managed client may then have management firmware that can analyze the sequential numbers to detect any replay attack on the signal 301. In addition, the entire firmware update process including signal 301 may take place out-of-band, so that firmware can be updated or repaired remotely even on a managed client with a malfunctioning or absent operating system (OS).

Figure 4:
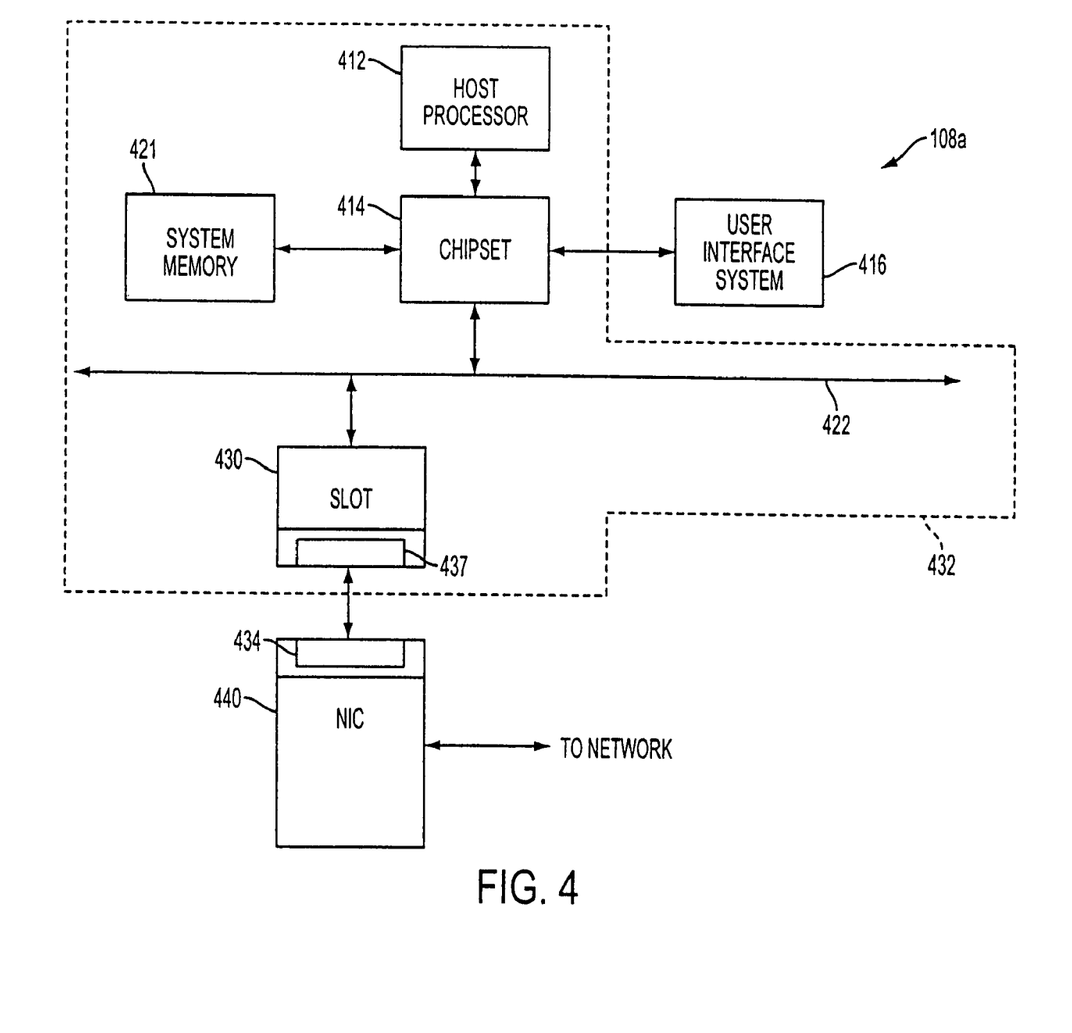
FIG. 4 is a block diagram of one embodiment of a server of the buyer's network of the system of FIG. 1.

FIG. 4 is a block diagram of one embodiment 108a of the server 108 of the system of FIG. 1. The server 108a may include a host processor 412, a bus 422, a user interface system 416, a chipset 414, system memory 421, and a network interface card (NIC) 440. The host processor 412 may include one or more processors known in the art such as an Intel® Pentium® IV processor commercially available from the Assignee of the subject application. The bus 422 may include various bus types to transfer data and commands. For instance, the bus 422 may comply with the Peripheral Component Interconnect (PCI) Express Base Specification Revision 1.0, published Jul. 22, 2002. available from the PCI Special Interest Group, Portland, Oreg., U.S.A. (hereinafter referred to as a "PCI Express™ bus"). The bus 422 may alternatively comply with the PCI-X Specification Rev. 1.0a, Jul. 24, 2000. available from the aforesaid PCI Special Interest Group, Portland, Oreg., U.S.A. (hereinafter referred to as a "PCI-X bus").

The user interface system 416 may include one or more devices for a human user to input commands and/or data and/or to monitor the system, such as, for example, a keyboard, pointing device, and/or video display. The chipset 414 may include a host bridge/hub system (not shown) that couples the processor 412, system memory 421, and user interface system 416 to each other and to the bus 422. The chipset 414 may include one or more integrated circuit chips, such as those selected from integrated circuit chipsets commercially available from the Assignee of the subject application (e.g., graphics memory and I/O controller hub chipsets), although other integrated circuit chips may also, or alternatively be used. System memory 421 may include one or more machine readable storage media such as random-access memory (RAM), dynamic RAM (DRAM), static RAM (SRAM), read only memory (ROM), magnetic disk and/or any other device that can store information.

When the NIC 440 is properly inserted into the slot 430, connectors 434 and 437 become electrically and mechanically coupled to each other. When connectors 434 and 437 are so coupled to each other, the NIC 440 becomes electrically coupled to bus 422 and may exchange data and/or commands with system memory 421, host processor 412, and/or user interface system 416 via bus 422 and chipset 414.

Alternatively, without departing from this embodiment, the operative circuitry of the NIC 440 may be included in other structures, systems, and/or devices. These other structures, systems, and/or devices may be, for example, in the motherboard 432, and coupled to the bus 422. These other structures, systems, and/or devices may also be, for example, comprised in chipset 414. The NIC 440 may act as an intermediary between the server 108a and a network to permit communication to and from the server 108a and other nodes coupled to the network. As such, the NIC 140 may pass data and/or commands to and from the network to the system 100.

Various software routines having instructions may be stored in any variety of machine readable medium such as memory 421. When the instructions are executed by a machine, e.g., the host processor 412, it may result in the server 108a performing the operations detailed herein as being performed by the server.

Figure 5:
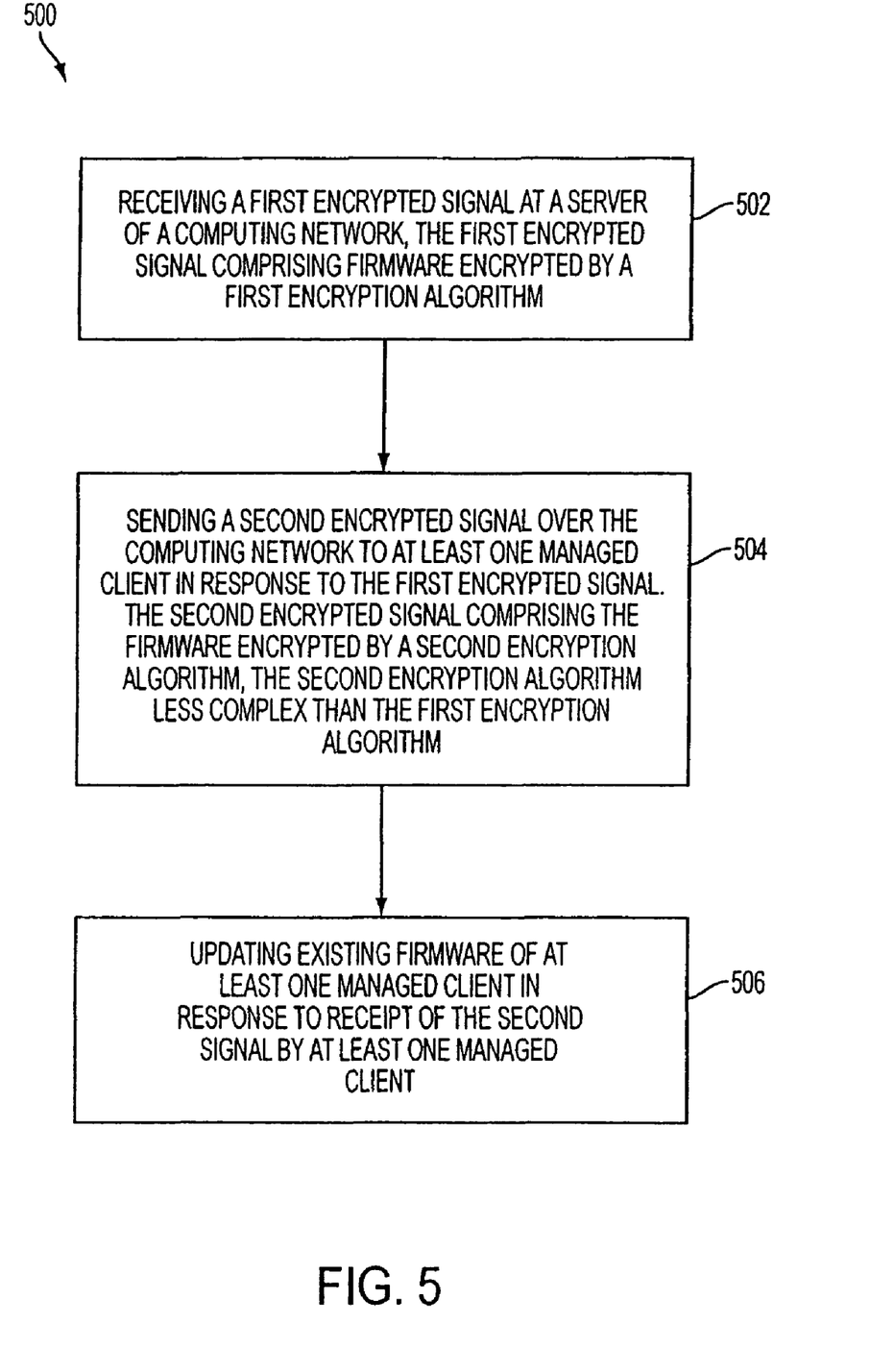
FIG. 5 is a flow chart illustrating operations according to an embodiment.

FIG. 5 is a flow chart of exemplary operations 500 consistent with an embodiment. Operation 502 may include receiving a first encrypted signal at a server of a computing network. The first encrypted signal may comprise firmware encrypted by a first encryption algorithm. Operation 504 may include sending a second encrypted signal over the computing network to at least one managed client in response to the first encrypted signal. The second encrypted signal may comprise the firmware encrypted by a second encryption algorithm, where the second encryption algorithm is less complex than the first encryption algorithm. Operation 506 may include updating existing firmware of at least one managed client in response to receipt of the second signal by at least one managed client.

It will be appreciated that the functionality described for all the embodiments described herein, may be implemented using hardware, firmware, software, or a combination thereof.

In one embodiment, the firmware update provided by the encrypted signal 301 (see FIG. 3) may be partitioned into a firmware area and a firmware update area. This may enable the firmware update application in the firmware update area to be re-started at the beginning after a power failure. All firmware necessary for standalone operation of the firmware update application may be partitioned into the firmware update area (e.g., a copy of the kernel, copy of the operating system including the network stack, etc.).

Figure 6:
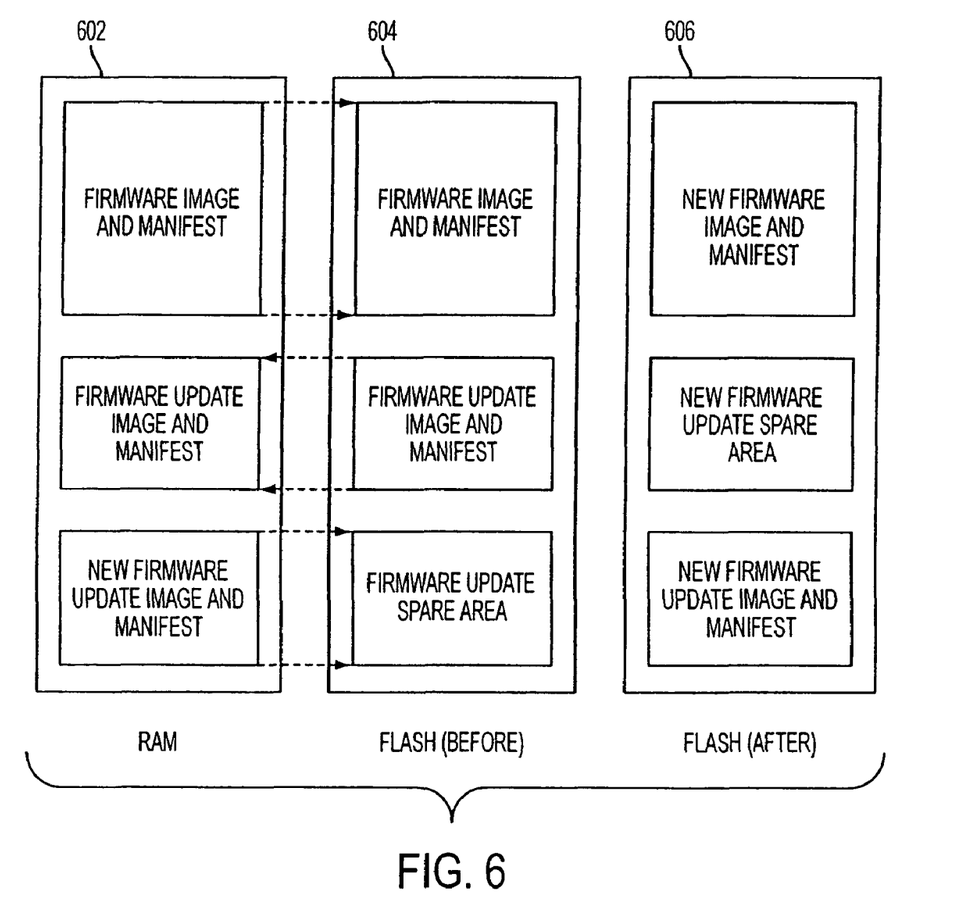
FIG. 6 is a diagram illustrating partitioning of flash memory of one embodiment.

Updates of both the firmware area and the firmware update area may involve a two-step process including downloading to RAM and writing to flash of a managed client. FIG. 6 illustrates one operation for flash partitioning having sufficient spare space in flash available. RAM 602 is illustrated and partitioned flash is also illustrated before 604 and after 606 the update. If sufficient spare space in flash is not available, other operations may be performed.

Additional embodiments of informing managed clients that a firmware update is available may be governed by a provisioned managed client policy which managed clients would use to autonomously initiate a check for firmware updates. The managed client policy may inform the managed client the frequency to check for a firmware update, e.g., once a week, the version to obtain, actions to take if there are errors, and the interfaces over which the updates may be obtained, and the location or locations to connect to download the firmware update.

During such managed client updates, a managed client may establish a communication session, e.g., a TLS session, with a server, e.g. server 108, and a Hypertext Transfer Protocol (HTTP) Basic Authentication may be performed between the managed client and server. Once authenticated, the managed client may send a message, e.g., a Simple Object Access Protocol (SOAP)-encoded application message encapsulated in HTTP packets, to determine if a firmware update is available and its version. If the version available matches the version contained in the policy, the managed client may download one or more Manifests and modules that comprise the firmware update into RAM. The managed client may then validate the Manifests and modules, and if valid, write them into flash. If invalid, the managed client may discard the firmware update and perform those operations specified in the managed client policy, e.g., write an entry in to the system event log, send an error message to an applicable server, and/or send alert message to the nearest Management Console. Once all firmware processing is completed by the managed client, the managed client may terminate the communication session with the server, e.g., server 108.

If there is a need to immediately update the firmware for a particular managed client (e.g., critical bug fix), the management console server 110 may establish a communication session to one or more of the managed clients 112, 114, 116. When the managed client accepts a communication session with the management console server, an authentication process, e.g., the HTTP Basic Authentication process, may be performed. Once authenticated, the management console server may send a message instructing the firmware update process to begin, e.g., the message may be a SOAP-encoded application message encapsulated in HTTP packets.

The firmware update application may preserve current firmware image settings, e.g., original equipment manufacturer (OEM) provisioned data, policy settings, etc.) to enable roll-back to a previous firmware version.

Thus, in summary, one embodiment may comprise a system. The system may comprise a server and a managed client. The server may comprise a network interface card capable of being coupled to a bus. The server may be capable of receiving a first encrypted signal, the first encrypted signal comprising firmware encrypted by a first encryption algorithm. The server may further capable of sending a second encrypted signal, the second encrypted signal comprising the firmware encrypted by a second encryption algorithm, the second encryption algorithm less complex than said first encryption algorithm. The managed client may be capable of receiving the second encrypted signal. The managed client may further be capable of decrypting the firmware encrypted with the second encryption algorithm into decrypted firmware. The managed client may further comprise existing firmware, and the managed client may further be capable of updating the existing firmware using the decrypted firmware.

Another embodiment may comprise an article. The article may comprise a machine readable medium having stored thereon instructions that when executed by a machine results in the following: discovering a first encrypted signal at a server of a computing network, the first encrypted signal comprising firmware encrypted by a first encryption algorithm; and sending a second encrypted signal over the computing network to at least one managed client in response to the first encrypted signal, the second encrypted signal comprising the firmware encrypted by a second encryption algorithm, the second encryption algorithm less complex than the first encryption algorithm.

Yet another embodiment may comprise an apparatus. The apparatus may comprise a server. The server may be capable of receiving a first encrypted signal, the first encrypted signal comprising firmware encrypted by a first encryption algorithm. The server may be further capable of sending a second encrypted signal to at least one managed client, the second encrypted signal comprising said firmware encrypted by a second encryption algorithm, the second encryption algorithm less complex than the first encryption algorithm.

Advantageously, in these embodiments, firmware updates may be made securely and automatically to managed clients. As such, manual intervention by an IT administrator may be avoided. Hence, associated IT overhead costs may be reduced and efficiency of firmware updates may be improved. New firmware may also be securely provided to each managed client while also simultaneously not requiring excessively strong end-to-end data encryption. Hence, decryption of an encrypted signal containing the new firmware may be simplified at the managed client. As such, excessive memory resources at the managed client may be avoided and associated power consumption of such excessive resources may also be avoided.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   receiving a first encrypted signal at a server of a computing network, said first encrypted signal comprising firmware encrypted by a first encryption algorithm having a first complexity level;
   sending a second encrypted signal over said computing network to at least one managed client in response to said first encrypted signal, said second encrypted signal comprising said firmware encrypted by a second encryption algorithm having a second complexity level, wherein said first complexity level is greater than said second complexity level;
   updating existing firmware of said at least one managed client in response to receipt of said second signal at said at least one managed client;
   decrypting said firmware encrypted by said first encryption algorithm into decrypted firmware;
   storing said decrypted firmware in a storage location;
   encrypting said decrypted firmware with said second encryption algorithm to provide said second encrypted signal;
   sending a notification signal to said at least one managed client, said notification signal being automatically sent in response to said decrypted firmware in said storage location, said notification signal comprising a portion representative of an update command and a portion representative of said storage location;
   authenticating said update command; and
   sending said second encrypted signal from said storage location to said at least one managed client if said update command is authenticated by said authenticating operation.

2. The method of claim 1, wherein said second encrypted signal comprises a plurality of packets, said plurality of packets each having sequential numbers.

3. The method of claim 1, wherein said storage location is comprised in said server.

4. The method of claim 1, wherein said second encrypted signal complies with a Trivial File Transfer Protocol (TFTP).

5. A system comprising:
   a server comprising a network interface card capable of being coupled to a bus, said server capable of receiving a first encrypted signal, said first encrypted signal comprising firmware encrypted by a first encryption algorithm having a first complexity level, said server further capable of sending a second encrypted signal, said second encrypted signal comprising said firmware encrypted by a second encryption algorithm having a second complexity level, wherein said first complexity level is greater than said second complexity level; and
   a managed client capable of receiving said second encrypted signal, said managed client further capable of decrypting said firmware encrypted with said second encryption algorithm into decrypted firmware, said managed client further comprising existing firmware, and said managed client is further capable of updating said existing firmware using said decrypted firmware.

6. The system of claim 5, wherein said second encrypted signal comprises a plurality of packets, said plurality of packets each having sequential numbers.

7. The system of claim 5, wherein said server is further capable of decrypting said firmware encrypted by said first encryption algorithm into decrypted firmware, and said server is further capable of storing said decrypted firmware in a storage location, and wherein said server is further capable of encrypting said decrypted firmware with said second encryption algorithm to provide said second encrypted signal.

8. The system of claim 7, wherein said storage location is comprised in said server.

9. The system of claim 7, wherein said server is further capable of automatically sending a notification signal to said managed client in response to said decrypted firmware in said storage location, said notification signal comprising a portion representative of an update command and a portion representative of said storage location, wherein said managed client is further capable of authenticating said update command, and wherein said server is further capable of sending said second encrypted signal from said storage location to said managed client if said update command is authenticated by said managed client.

10. An apparatus comprising:
    a server capable of receiving a first encrypted signal, said first encrypted signal comprising firmware encrypted by a first encryption algorithm having a first complexity level, said server further capable of sending a second encrypted signal to at least one managed client, said second encrypted signal comprising said firmware encrypted by a second encryption algorithm having a second complexity level, wherein said first complexity level is greater than said second complexity level
    wherein said server is further capable of decrypting said encrypted firmware encrypted by said first encryption algorithm into decrypted firmware, and said server is further capable of storing said decrypted firmware in a storage location, and wherein said server is further capable of encrypting said decrypted firmware with said second encryption algorithm to provide said second encrypted signal.

11. The apparatus of claim 10, wherein said storage location is comprised in said server.

12. The apparatus of claim 10, wherein said server is further capable of automatically sending a notification signal to said managed client in response to said decrypted firmware in said storage location, said notification signal comprising a portion representative of an update command and a portion representative of said storage location.

* * * * *